Aug. 17, 1937.   A. LA R. PARKER   2,090,266
ELASTIC COUPLING FOR TUBES
Filed April 27, 1935
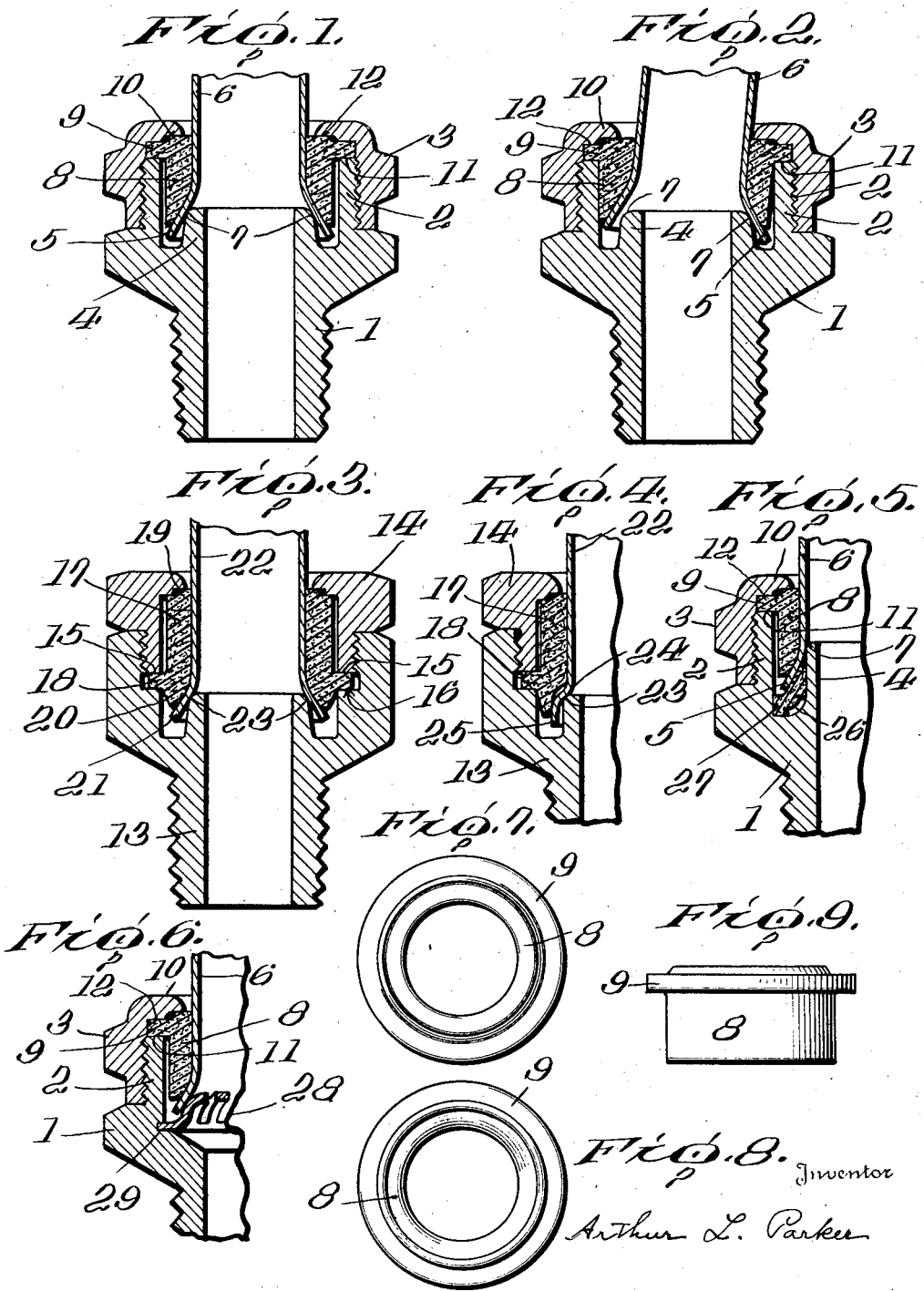
Inventor
Arthur L. Parker
By Mason & Porter
Attorneys Patented Aug. 17, 1937

2,090,266

UNITED STATES PATENT OFFICE 2,090,266

ELASTIC COUPLING FOR TUBES

Arthur La Rue Parker, Cleveland, Ohio

Application April 27, 1935, Serial No. 18,664

2 Claims. (Cl. 285—86)

The invention relates to new and useful improvements in an elastic coupling which may be used for joining a tube to another part or for joining two tubes in a line.

An object of the invention is to provide a coupling which is liquid-tight and which permits the tube to shift on its attachment to the coupling to different angular positions relative to the axis of the coupling.

A further object of the invention is to provide a tube coupling of the above type wherein the tube is clamped in the coupling by a resilient sleeve contacting with the tube and elastically gripping the same, and which sleeve is in turn firmly clamped to the coupling members in a restricted region.

In the drawing—

Figure 1 is a longitudinal sectional view through an elastic coupling embodying the improvements and showing a tube end secured thereto;

Fig. 2 is a view similar to Fig. 1, but showing the tube as shifted in the coupling to an angular position relative to the longitudinal axis of the coupling;

Fig. 3 is a view similar to Fig. 1, but showing a modified form of arrangement of the clamping flange on the resilient sleeve;

Fig. 4 is a longitudinal sectional view at one side of the coupling and showing a slightly modified shaping of the expanded end of the tube and the end of the resilient member which contacts therewith;

Fig. 5 is a view through one side of the coupling and showing a further modified form of seat and seating member contacting with the inner surface of the expanded end of the tube;

Fig. 6 is a view similar to Fig. 5, but showing a still further modified form of seat contacting with the inner expanded end of the tube;

Fig. 7 is an outer end view of the resilient sleeve shown in Fig. 1;

Fig. 8 is an inner end view of the same, and

Fig. 9 is a side view of the same.

The invention has to do with an elastic coupling for metal tubes or pipes and resides broadly in the manner of clamping the tube to the coupling member so as to provide a shiftable connection as well as a liquid-tight connection. The elastic coupling includes metallic members which may have a threaded connection or any other well-known connection. These coupling members have a recess formed in one member and partly in the other which is adapted to receive the expanded end of a tube. One of the coupling members preferably carries a seat which extends into and lightly contacts with the expanded end of the tube. Surrounding the tube is a resilient sleeve dimensioned so that it may be stretched over the tube and have a tight holding connection therewith. Said sleeve is provided with a projecting flange. The coupling members are so constructed as to provide clamping shoulders which contact with the opposite faces of the flange on the resilient sleeve, and thus said sleeve is gripped and firmly attached to the coupling members. This resilient sleeve is so dimensioned that it elastically bears against the expanded end of the tube and will lightly hold the flared end of the tube in contact with its seat, at the same time, permitting the tube to shift to different angular positions relative to the longitudinal axis of the coupling.

It is thought that the invention will be better understood by a detail description of the present illustrated embodiment of the invention. It is understood, however, that the invention may be applied to other forms of coupling members than those illustrated.

The coupling members as shown in Figures 1 and 2 include a male member 1 having a projecting threaded portion 2, and a female member 3 having a threaded portion adapted to receive the threaded portion on the male member, and thus the two coupling members are joined. The male member is provided with a projecting portion 4 which is adapted to extend into the expanded end 5 of a tube 6. The projecting portion 4 has a restricted curved seat 7 which normally lightly contacts with the inner face of the expanded end 5 of the tube. The coupling members are shaped so as to provide a recess to receive the tube end. Disposed within this recess is a resilient member 8. This resilient member 8 is shown in detail in Figures 7 to 9 of the drawing. Said resilient member includes a sleeve portion from which projects a flange 9 which is relatively thin so that it will easily flex and serve, in a measure, as a diaphragm for joining the tube to the coupling members so as to permit easy shifting of the tube to different angular positions relative to the longitudinal axis of the coupling without disturbing the liquid-tight joint.

The female coupling member 3 is provided with an inwardly extending portion 10 which is spaced away from the outer end of the projecting portion 2 of the male member 1. The end 11 of the male member 1 forms one clamping shoulder while the inner flat face 12 of the female member provides an opposed clamping shoulder. The flange 9 of the resilient member 8 is firmly clamped to the coupling members by these shoulders 11 and 12 engaging the opposite faces of the flange. The resilient member 8 at its inner end is shaped so as to conform to the expanded end of the tube. The inwardly projecting portion 10 of the female coupling member 3 overlies the outer end of the resilient sleeve. The resilient sleeve is so dimensioned relative to the recess in the coupling members and this inwardly projecting portion 10 of the female coupling member that said resilient sleeve is free from compression, except in the region of the flange. The sleeve is furthermore dimensioned so that it may be stretched over the tube and elastically contacts with the tube, and when the tube is attached to the coupling, the resilient sleeve will elastically contact with the flared end of the tube and lightly hold the tube in contact with the seat 7. The resilient sleeve may be made of any suitable material, but is preferably made of synthetic rubber.

The parts of the coupling are so dimensioned that when the coupling members are secured together, the male member will contact with a shoulder on the female member and limit further movement thereof. At this time, however, the flange 9 of the resilient sleeve is firmly clamped between the coupling members. The resilient sleeve makes a liquid-tight connection with the tube and at the same time it permits the tube to shift without disturbing this liquid-tight connection. This provides a coupling which is especially adapted for use in gasoline pipe lines for supplying fuel to engines used in moving vehicles, and particularly as used in flying machines.

As clearly shown in Fig. 2, the tube 6 is shifted to a considerable angle relative to the longitudinal axis of the coupling. The resilient sleeve has moved with the flared end of the tube and has maintained a liquid-tight connection therewith. This movement of the tube in the coupling is permitted by the clamping of the flange of the resilient sleeve to the coupling members and the movement of the resilient sleeve relative to the coupling members through the flexing of the flange.

In Fig. 3 of the drawing there is shown a slightly different form of the invention. The female coupling member 13 has a threaded portion which receives a threaded portion on the male member 14. When these members are in engagement, the end 15 of the male member 14 is spaced away from the shoulder 16 on the female coupling member 13. The resilient sleeve 17 is very similar in construction to the resilient sleeve 8, except that the flange 18 is adjacent the inner end instead of adjacent the outer end, as shown in Figures 1 and 2. This flange 18 is firmly clamped between the shoulders 15 and 16. The male member 14 has an inwardly projecting portion 19 which overlies the outer end of the resilient sleeve. The inner end of the resilient sleeve is tapered as indicated at 20 to conform to the expanded end 21 of the tube 22. The female member has a projecting portion extending into the tube and a curved restricted seat 23 which contacts with the inner surface of the expanded end of the tube. The resilient sleeve is preferably so dimensioned that it is spaced away from the inner wall of the male member 14. The tube is held by this resilient sleeve and functions in precisely the same manner as described in connection with the resilient sleeve shown in Figures 1 and 2. In this form of the invention, however, the clamping flange or diaphragm is nearer the seat with which the tube contacts.

In Fig. 4 of the drawing there is shown a slightly modified form of resilient sleeve and the shaping of the expanded end of the tube is also slightly different. Otherwise, the construction shown in this figure is similar to that shown in Fig. 3, and similar reference numerals have been applied thereto. The tube 22 is shaped so as to provide a flared portion 24 and a portion 25 of larger diameter than the tube 22. The seat 23 contacts with this flared portion of the tube. The resilient sleeve 17 is shaped so as to conform in a general way to the shaping of the outer face of the expanded end of the tube. The manner of holding the tube so as to permit stiffening movements of the tube without disturbing the tightness of the joint is similar to that described above.

In Fig. 5 of the drawing there is shown a construction similar to that illustrated in Fig. 1, but the parts contacting with the inner face of the flared end of the tube are slightly different. Like reference numerals have been added to this form of coupling. The male member 1 is provided with a projecting portion carrying a seat 7 which contacts with the tube at the base of the tapered end 5 thereof. The metal is cut away so as to provide a recess 26, and in this recess is located a resilient member 27. Said member 27 contacts with the inner face of the tube 6 and also with the outer face of the projecting portion 4 of the male member 1. By this arrangement, the expanded end of the tube is held between the inner end of the resilient sleeve 8 and the resilient member 27. There is a portion of the resilient member 27 cut away so as to provide a recess to give greater elasticity to this member 27, while maintaining light contact between said member and the flared end of the tube. The manner of clamping the tube so that it may shift without disturbing the tightness of the connection is similar to that described above, and it is not thought that further description thereof is necessary.

In Fig. 6 of the drawing there is shown a coupling of the form illustrated in Fig. 1, but there is a different form of seat for the tube end. In this form of the invention, a metal disk 28 is provided, which disk is expanded into a recess 29 in the male member 1, and thus the seat is attached to the male member and forms a unit therewith. This seat 28 has a spherical outer surface which lightly contacts with the inner surface of the expanded end of the tube in the restricted region. The seat is slit from the inner edge outwardly so that it may yield to the pressure of the resilient sleeve when the couplings are joined. The manner of clamping the tube to the coupling functions in the same way as described above. The tube can shift to different angular positions due to the changing of the shape of the resilient sleeve within its elastic limits and the diaphragm action of the clamping flange which is firmly secured to the coupling members. In all forms of the invention, when the tube is secured to the coupling members, the resilient member is rigidly and firmly clamped in the region of its supporting flange. The remaining portion of the resilient sleeve, while functioning to hold the tube against its seat in the coupling, is free to expand or contract within its elastic limits under the shifting movement of the parts.

It is understood that if two pipes are to be joined in a line, that the coupling member will be similar in construction to that described above, but it will have duplicate resilient sleeves which will be independently clamped to the coupling members for supporting the same. It is obvious that many changes may be made in the details of construction without departing from the spirit of the invention as set forth in the appended claims.

Having thus described the invention, what I claim as new and desire to secure by Letters Patent, is—

1. An elastic coupling for tubes including metallic coupling members having therebetween a recess adapted to receive the tapered flared end of a tube, a yielding seat carried by one of said coupling members and adapted to extend into and contact with the inner surface of the flared end of the tube, a resilient sleeve surrounding said tube end and elastically contacting therewith, said resilient sleeve having a laterally projecting flange and said coupling members having means for gripping and clamping said flange, said resilient member being dimensioned so as to elastically engage the flared end of the tube and lightly hold said flared end of the tube against said yielding seat.

2. An elastic coupling for tubes including coupling members having therebetween a recess adapted to receive an expanded end of a metal tube, one of said coupling members having a projecting portion extending into the expanded end of the tube and forming a seat therefor, a resilient member surrounding and substantially filling said recess about said tube, and elastically contacting with the tube and the expanded end thereof, said resilient member having an outwardly projecting flange, said coupling members each having a portion contacting with said flange for clamping the same, said resilient member being dimensioned and arranged so as to hold the expanded end of the tube lightly in engagement with the seat and so as to provide for limited resiliently opposed angular movement between said tube and coupling while positively preventing withdrawal of the tube from the resilient member.

ARTHUR LA RUE PARKER.